US010893241B2

(12) United States Patent
Latchman et al.

(10) Patent No.: US 10,893,241 B2
(45) Date of Patent: Jan. 12, 2021

(54) SYSTEM AND COMPUTER PROGRAM PRODUCT FOR MONITORING, CONTROLLING AND SURVEILLING PORTABLE LABORATORY REACTOR

(71) Applicant: Xerox Corporation, Norwalk, CT (US)

(72) Inventors: Harry P. Latchman, Mississauga (CA); David T. Borbely, Port Burwell (CA); Mihaela M. Birau, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 281 days.

(21) Appl. No.: 16/037,199

(22) Filed: Jul. 17, 2018

(65) Prior Publication Data

US 2020/0029053 A1   Jan. 23, 2020

(51) Int. Cl.
*H04N 7/18* (2006.01)
*B01J 19/18* (2006.01)
*B01J 19/00* (2006.01)

(52) U.S. Cl.
CPC .......... *H04N 7/185* (2013.01); *B01J 19/0013* (2013.01); *B01J 19/0066* (2013.01); *B01J 19/0086* (2013.01); *B01J 19/18* (2013.01)

(58) Field of Classification Search
CPC .......... B01J 2219/00094; B01J 19/0066; B01J 19/18; B01J 19/0013; B01J 19/0086; H04N 7/185
See application file for complete search history.

(56) References Cited

U.S. PATENT DOCUMENTS

| 2016/0230291 A1* | 8/2016 | Albrecht ................ C25B 1/46 |
| 2017/0250428 A1* | 8/2017 | Gilliam ............ H01M 8/04313 |
| 2017/0308054 A1* | 10/2017 | Sarmiento-Klapper ..................... E21B 21/062 |

OTHER PUBLICATIONS

Harry P. Latchman, "White Paper Lab of the Future", Dec. 15, 2017, 9 pages, Xerox Research Centre of Canada.

* cited by examiner

*Primary Examiner* — Shogo Sasaki
(74) *Attorney, Agent, or Firm* — Hoffman Warnick LLC

(57) ABSTRACT

There is described a portable reactor system and computer program product. The system allows an operator to remotely monitor and control the chemical processes of a laboratory reactor on an interface device such as a tablet, remote computer or smart phone. At any time, live video of the reactor can be viewed. The temperature of the reactor, temperature of a bath surrounding the reactor, agitator speed of the blade or impeller in the reactor, conductivity of the reactor contents and pH of the reactor contents can be remotely controlled and monitored.

20 Claims, 9 Drawing Sheets

US 10,893,241 B2

SYSTEM AND COMPUTER PROGRAM PRODUCT FOR MONITORING, CONTROLLING AND SURVEILLING PORTABLE LABORATORY REACTOR

BACKGROUND

Field of Use

The disclosure herein is directed automated laboratory systems for processing a sample.

Background

Typically wet laboratories usually operate 5 days a week, 8 hours a day using a specialized and skilled workforce. The workforce has to be present in the wet laboratories to monitor, control and oversee the chemical reaction processes.

It would be desirable to have wet laboratories that are portable and can be monitored and controlled at any time.

SUMMARY

In one aspect, there is provided an automated wireless laboratory system. The automated laboratory system includes a reactor having multiple ports, a drive motor for agitating contents within the reactor, a speed sensor for measuring the revolutions per minute of the drive motor, a temperature sensor for measuring the temperature within the reactor, a pressure sensor for measuring the pressure within the reactor, a pH sensor for measuring the pH of the contents within the reactor, a conductivity sensor for measuring the conductivity of the contents within the reactor, a bath surrounding the reactor for heating and/or cooling the reactor and a bath temperature sensor for measuring the temperature of the bath. The automated wireless laboratory system includes at least one computing device which is configured to monitor and wirelessly transmit the temperature within the reactor, the pressure within the reactor, the pH, the conductivity, the revolutions per minute, and the temperature within the bath. The computing device is configured to receive wireless instructions from a remote user that specify the speed of the drive motor, the temperature with in the reactor, the bath temperature, the pH, the pressure and the conductivity. The computing device is configured to set the speed of the drive motor, the temperature with in the reactor, the pH and the pressure.

In another aspect, there is provided a system including at least one computing device configured to control a reactor system. The reactor system includes a reactor having a plurality of ports, a drive motor for agitating contents within the reactor, a speed sensor for measuring the revolutions per minute of the drive motor, a temperature sensor for measuring the temperature within the reactor, a pressure sensor for measuring the pressure within the reactor, a pH sensor for measuring the pH of the contents within the reactor and a conductivity sensor for measuring the conductivity of the contents within the reactor. The reactor system includes a bath surrounding the reactor for at least one of heating or cooling the reactor and a bath temperature sensor for measuring the temperature of the bath. The computing device performs actions including: wirelessly transmitting to a remote user; the temperature within the reactor, the bath temperature, the pressure, the pH, the conductivity, and the revolutions per minute. The computing device performs actions including receiving wireless instructions from the remote user that specify, a RPM of the drive motor and adjusting the agitator motor to the RPM; a bath temperature and adjusting the bath temperature, the pH, the pressure and the conductivity.

In another aspect, there is provided a computer program product comprising program code, which when executed by at least one computing device, causes the at least one computing device to control a reactor by performing actions. The action include wirelessly transmitting to a remote user; a temperature within the reactor, a temperature in a bath surrounding the reactor, the pressure in the reactor, a pH in the reactor, a conductivity in the reactor, and revolutions per minute of an agitator in the reactor. The instruction include receiving wireless instructions from the remote user that specify; a RPM of the drive motor and adjusting the agitator motor to the RPM; the bath temperature. The at least one computing device transmits instructions to set the bath temperature, the pH, the pressure and the conductivity.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
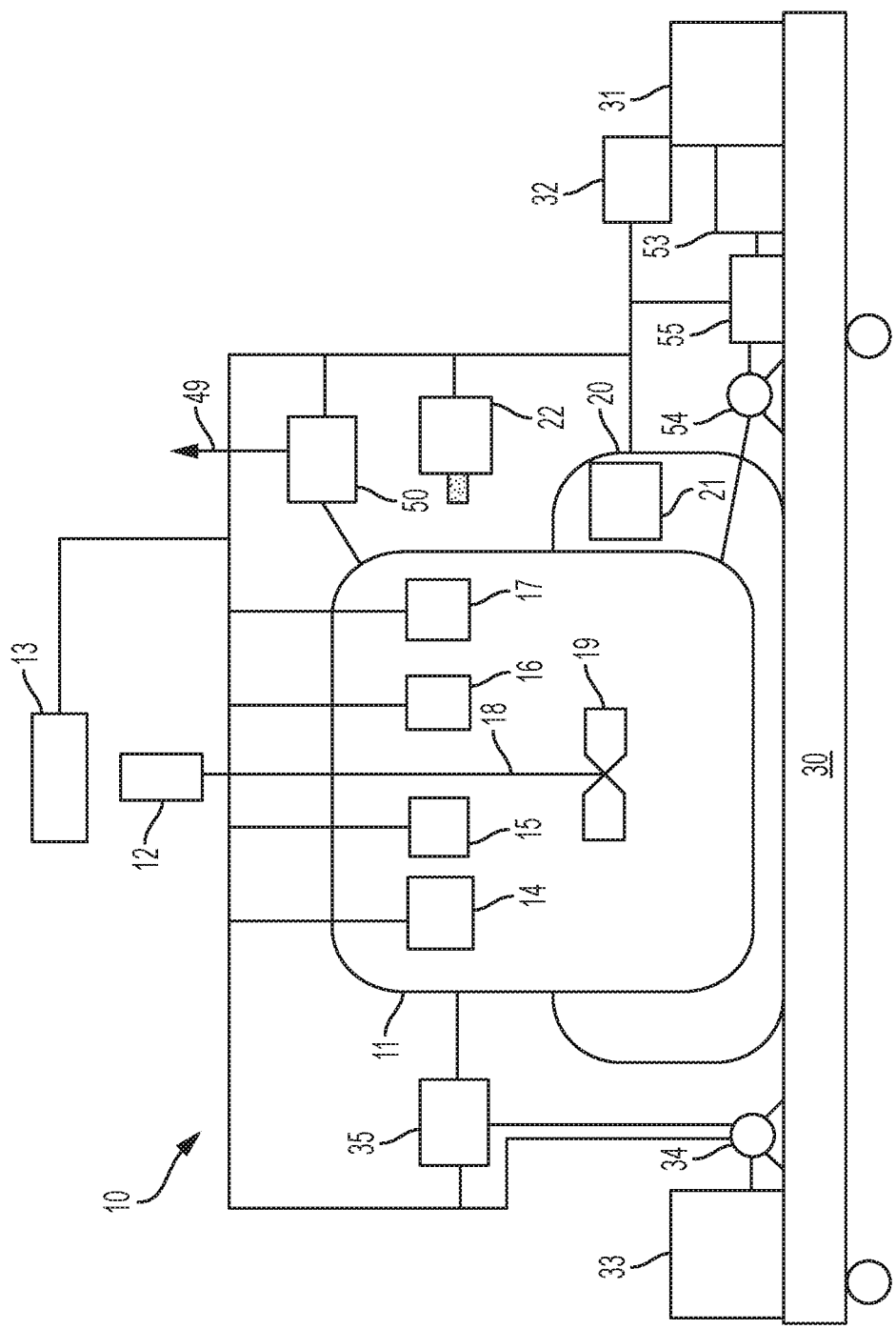
FIG. 1 is a schematic illustration of a wirelessly controlled reactor in accordance with the present disclosure.

It should be noted that some details of the FIGS. have been simplified and are drawn to facilitate understanding of the embodiments rather than to maintain strict structural accuracy, detail, and scale.

DETAILED DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Disclosed herein is a system and computer program product that integrates secured wireless instrumentation that monitors, surveilles and controls a portable laboratory reactor.

The system and computer program product described herein allows operators to attend to other tasks while remotely monitoring and controlling the chemical processes of a laboratory reactor on an interface device such as a tablet, remote computer or smart phone. At any time, live video of the reactor can be viewed. Process changes, including temperature of the reactor or bath, agitator speed in revolutions per minute (RPM) of the blade or impeller, conductivity of the reactor contents, addition of materials, removal of materials and pH of the reactor contents can be implemented remotely. The system and computer program product described herein allows a reactor to be operated at any time, e.g., over-night, weekends and holidays, in a safe and secure environment with e-mail alarm notifications sent to a remote device.

Important features of this novel integrated system are wireless laboratory chemical reaction monitoring, wireless laboratory chemical reaction control, including automated control within preset parameters (e.g. temperature (reactor and bath), pH, conductivity, and agitator speed control), wireless video surveillance and portability (e.g. mobile skid).

The system 10 is depicted schematically in FIG. 1. FIG. 1 includes reactor 11, agitator motor 12, speed (RPM) sensor 13, pressure sensor 14, reactor temperature sensor 15, pH sensor 16 and conductivity sensor 17. In embodiments, reactor 11 can be a six liter, seven port, domed head, jacketed glass reactor. The system 10 can be configured for different sizes and types of reactors. The system 10 may be mounted on a portable skid 30. In embodiments, the skid 30 may be constructed from 1", 316 stainless steel, square tubing and may be fitted with adjustable and lockable casters. The entire skid 30 can be rolled in and out of different fume hoods in different locations as needed.

Agitator motor 12, can be mounted at the top of the reactor 11 and coupled to the shaft 18 and blade 19. The agitator motor may be mounted on a two-axis slider bracket for ease of access and maintenance. In embodiments, the agitator motor 12 is a 230 VAC, 3 phase, ⅜ hp, 54 lb-in, 340 RPM, inverter duty AC induction gear-motor. The system 10 can be configured for a different agitator motor 12, a different shaft 18 or a different blade 19 or impeller.

In embodiments, speed (RPM) sensor 13 is a magnetic disc attached to the top of the agitator shaft having magneto-resistive transmitter. The measurement range for the RPM sensor 13 is 0 to 500 RPM. The system 10 can be configured for other speed sensors.

In embodiments, pressure sensor 14 is connected to one of the reactor ports. The measurement range for the pressure sensor 14 is 0 to 690 KPa absolute. The system 10 can be configured for other pressure sensors.

In embodiments, temperature sensor 15 may be a TEFLON® coated, PT100 RTD coupled with a transmitter. Temperature sensor 15 is inserted into the reactor 11 through one of the ports. The measurement range for the temperature sensor 15 may be from −200° C. to 850° C. The system 10 can be configured for other temperature sensors.

The pH sensor 16 can be fitted into a TEFLON® sleeve housing and inserted into the reactor via another of the multiple ports. This pH sensor has an inductive connector for field calibration and replacement. The measuring range for the pH sensor 16 is 0 to 14. The system 10 can be configured for other pH sensors.

Conductivity sensor 17 can be a 4-electrode sensor fitted into a TEFLON® housing adapter and inserted into the same port as the temperature sensor. Conductivity sensor 17 may have an inductive connector for field calibration and replacement. The measurement range for the conductivity sensor 17 is 0 to 500 milli siemens per cm (mS/cm). The system 10 may be configured for other conductivity sensors.

Additional ports are available on the reactor 11. The additional ports can be used for material loading, material removal, material sampling or venting as described below.

Bath 20 is provided to heat and cool reactor 11. In embodiments, bath 20 may be a 2.2 KW, 230 VAC, 3 phase unit with a temperature supply range of −25° C. to 200° C. and high temperature shutdown protection. Bath 20 uses oil as the heating/cooling medium, however, different types of baths can be used e.g. glycol etc. depending on laboratory process requirements. Bath temperature is monitored by temperature sensor 21. Bath temperature sensor 21 may be a 3 wire, PT100 RTD, coupled with a temperature transmitter. The bath temperature sensor 21 is inserted into the bath 20. The measurement range for temperature sensor 21 is −200 to 850° C. The system 10 can be configured for other bath temperature sensors 21.

A camera 22 can be mounted on a multi-axis adjustable arm and is positioned to record and provide real time images (video) and sound (audio) of the reactor 11 and contents therein. The camera is connected to an audio/video transmitter. The multi-axis adjustable arm may be connected to the computer system 402 to allow remote adjustment of the camera position. In embodiments, camera 22 can be a 1080 p, waterproof, built in microphone, 96.5 mm×73.8 mm×24 mm. The system 10 may be configured for other cameras or other mounts for the camera.

Figure 5:
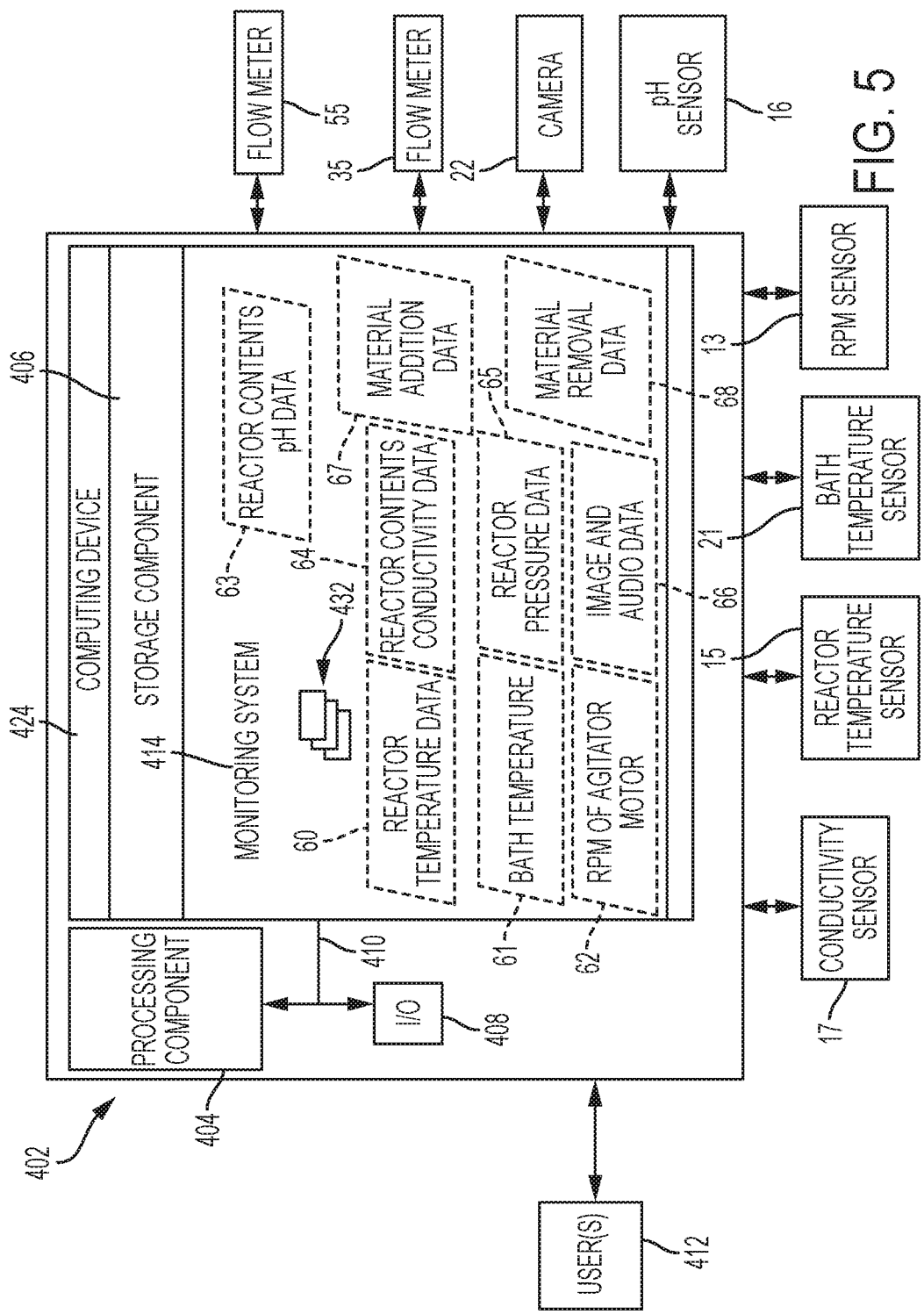
FIG. 5 shows an illustrative environment including a control system in accordance with the present disclosure.

A local display and interface 32 may be mounted on the skid 30. Display and interface 32 can be configured to display any measurement parameter (temperatures, pressure, conductivity, pH and RPM) and is connected to computer system 402 (FIG. 5).

In operation, materials can be loaded and removed automatically. As shown in FIG. 1, a material container 33 is connected to a pump 34 attached to a flow meter 35. The material container 33 is manually loaded. For discussion and simplicity only one material loading system 40 (FIG. 2) is shown; however, multiple material loading systems 40 (FIG. 2) may be included in system 10. Once there is sufficient material in material container 33, as may be determined by a level transmitter 39 (see FIG. 2), an operator may start an automatic material loading sequence into reactor 11. Operator will start this process as remote user 412 (see FIG. 5). A flow rate (e.g. kg/min) and required total weight (kg) can be entered into the computer system 402 and pump 34 is remotely started and the amount entered is automatically added to reactor 11 using pump 34. The amount added is metered through flow meter 35. The required amount of material is added to reactor 11 through one of the multiple ports. When the desired amount of material is added, pump 34 is automatically stopped through instructions from computer system 402.

Figure 2:
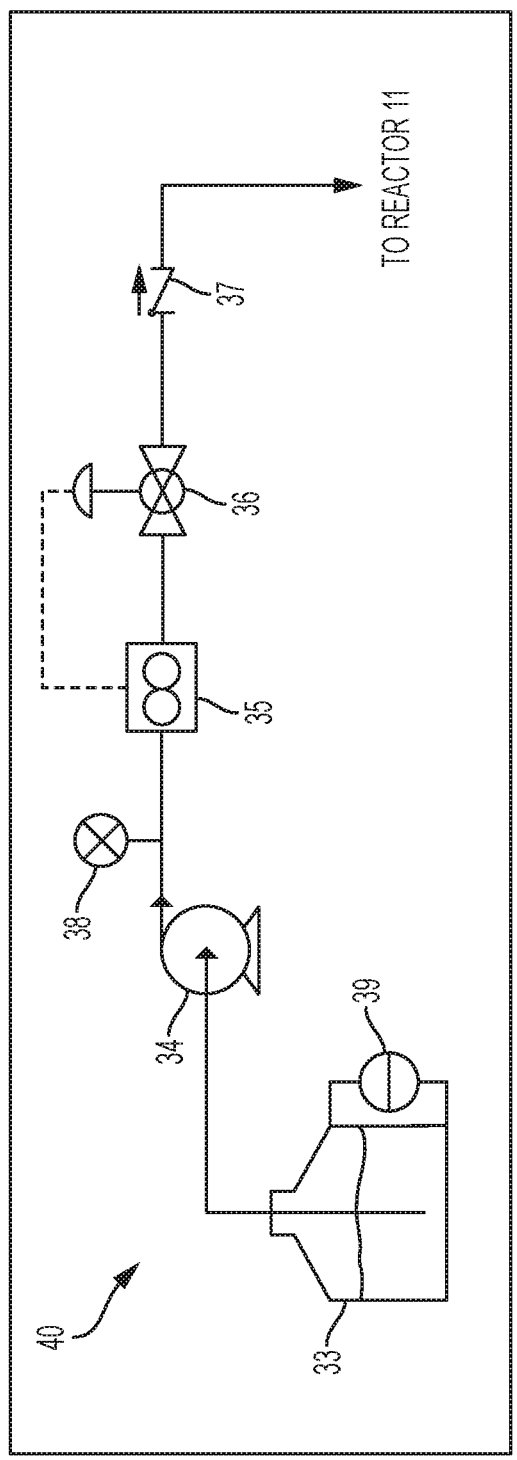
FIG. 2 is a schematic illustration of a wirelessly controlled material loading system in accordance with the present disclosure.

More detail of the material loading system(s) 40 that may be used herein in shown in FIG. 2. FIG. 2 shows material container 33 containing the desired material. In embodiments, pump 34, level transmitter 39, flow meter 35 and control valve 36 are all used for low and/or high level material loading protection. Flow meter 35 provides data 67 (FIG. 5) to computer system 404 to determine the amount of material added. In embodiments a check valve 37 is provided for protection against oversupply. Sensor 38 in FIG. 2 indicts through pressure that pump 34 is pumping material. The sensor 38 can be connected to computer system 404 to provide feedback for indicating over pressurization, due to flow blockage or other problem. Pump 34 can be shut down automatically by computer system 402 for the pump and an alarm notice sent to remote user 412. An alarm can be indicated on display 32 for an operator at the at the reactor system.

Material loading system 40 may be used in conjunction with feedback from pH sensor 16 to remotely and wirelessly control and monitor the pH of the contents of reactor 11. This is achieved by having, for example, an acid in one material loading system 40 and a base in another material loading system 40. The desired pH is maintained by adding appropriate amounts of acid and/or base.

In operation, materials can be removed automatically. As shown in FIG. 1, a material container 53 is connected to a pump 54 attached to a flow meter 55. For discussion and simplicity only one material removal system (FIG. 3) is shown; however, multiple material removal system(s) (FIG. 3) may be included in system 10. An operator may start an automatic material removal sequence to remove material from reactor 11. An operator will start this process as remote user 412 (see FIG. 5). A flow rate (eg. kg/min), and required total weight (kg) to be removed from reactor 11 (FIG. 1) can be entered into the computer system 402 by user 412 and pump 54 is remotely started and the amount entered by user 412 is removed from reactor 11 and metered through flow meter 55. The required amount of material is removed from reactor 11 through one of the multiple ports. When the programmed amount of material is removed, pump 54 will stop.

Figure 3:
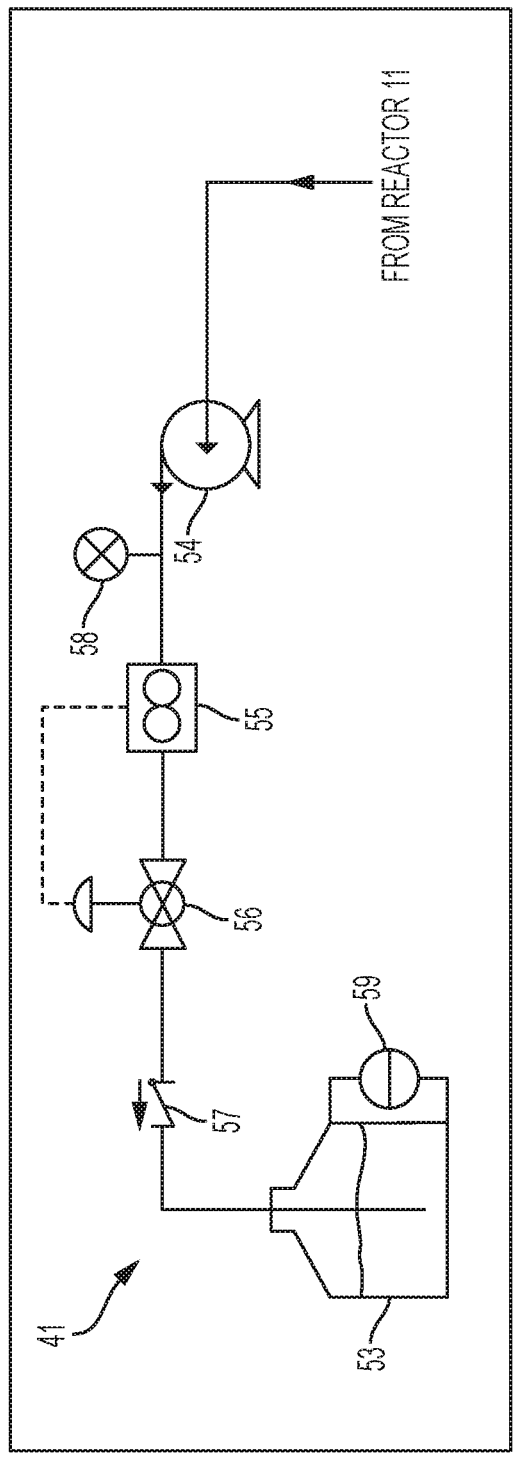
FIG. 3 is a schematic illustration of a wirelessly controlled material removal system in accordance with the present disclosure.

The material removed may use a system shown in FIG. 3; including material container 53 for the removed material. In embodiments, pump 54, flow meter 55 and check valve 57 are all used for material removal protection. Sensor 38 in FIG. 2 indicts through pressure that pump 34 is pumping material. The sensor 58 can be connected to computer system 404 to provide feedback for indicating over pressurization, due to flow blockage or other problem. Pump 54 can be shut down automatically by computer system 402 for the pump and an alarm notice sent to remote user 412. An alarm can be indicated on display 32 for an operator at the at the reactor system.

Figure 4:
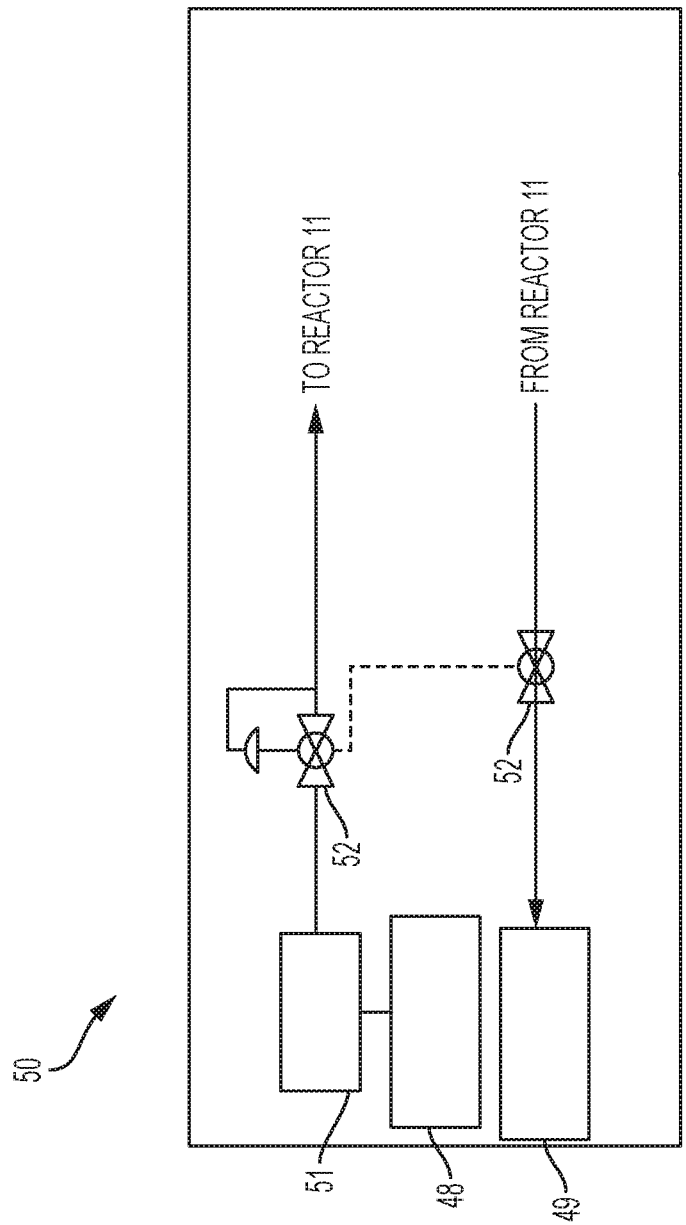
FIG. 4 is a schematic illustration of a wirelessly controlled pressure control system in accordance with the present disclosure.

With reference to the pressure control system 50 of FIG. 4, the pressure the pressure in reactor 11 (provided that reactor 11 is pressure rated) can be controlled and monitored remotely and wirelessly with feedback from pressure sensor 14 (FIG. 1). The pressure in reactor 11 is achieved by having a gas supply 48, such as nitrogen or other suitable gas such as argon, neon, hydrogen, carbon dioxide, helium, oxygen, etc., attached to a port on reactor 11. The pressure control system 50 is shown in more detail in FIG. 4.

Pressure control in reactor 11 (FIG. 1) is achieved by having a gas supply 48 attached to a port on reactor 11 via an electronic pressure regulator (EPR) 51 and a solenoid ON/OFF vent valve 52 attached to reactor 11. Vent 49 is connected to vent valve 52 and is opened to reduce pressure in reactor 11. This is depicted in FIG. 4. The desired reactor pressure is maintained in embodiments by adding gas such as nitrogen via the pressure regulator 51 through gas supply 48 or removing gas via vent 49 through solenoid valve 52. A pressure relief valve (PRV) (not shown) may be installed on reactor 11 as a safety device to avoid over-pressurization.

Conductivity control of the contents within the reactor can be controlled by utilizing the material loading system 40 in conjunction with feedback from conductivity sensor 17. This is achieved by having, for example, compatible materials of known conductivity (i.e. weak or strong acids and bases) in a material loading system 40 (FIG. 2). The desired conductivity is maintained by adding appropriate amounts of weak or strong acid and/or base.

Power supplies (not shown) for the agitator motor 12, bath 20, pumps 34 and 54, valves 36, and 56 and camera 22 may be housed in separate cabinet 31 mounted on the skid 30 and computer system 402 (FIG. 5). One or more separate cabinets may be used to house the devices described herein. For simplicity, only one cabinet is shown in FIG. 1. The temperature sensors 15, 21, RPM sensor 13 for the agitator motor 12, pH sensor 16, conductivity sensor 17, and the camera 22 may be wired to the cabinet 31. The cabinet 31 may also contain wireless transmitters for the temperature sensors 15, 21, RPM sensor 13, pH sensor 16, conductivity sensor 17, valves 36, 52 and 56, flow meters 35 and 55, and the camera 22. Cabinet 31 may also house the main system local start and emergency stop circuitry. Cabinet 31 may also house the computer system 402 (FIG. 5). Transmitters may be connected via a secured (encrypted), wireless Frequency Hopping Spread Spectrum (FHSS) 902-928 MHz, license free, 1 Watt, bi-directional Radio Frequency network. This wireless I/O network 408 (FIG. 5) includes communication-failure notification and diagnostics. The low frequency (902-928 MHz) radio waves provide excellent penetration through walls and other obstacles making it optimal for non-line-of-sight applications. The wireless transmitters can be housed in the cabinet 31.

The system may include the alarms. An alarm can occur when a blown fuse occurs in the electronic circuitry. An alarm can occur when a power disruption occurs.

FIG. 5 shows a computer system 402 including a monitoring and control system 414, for performing the functions described herein according to various embodiments. The computer system 402 that can perform one or more processes described herein in order to monitor the reactor temperature 60, the bath temperature 61, the speed of the agitator motor 62, the pH of the reactor contents 63, the conductivity of the reactor contents 64, the pressure in the reactor 65, image and audio data 66, the material addition data 67 and the material removal data 68. In particular, the computer system 402 is shown as including the monitoring and control system 414, which makes computer system 402 operable to monitor this data and performing any/all of the processes described herein and implementing any/all of the embodiments described herein.

The computer system 402 is shown including a computing device 424, which can include a processing component 404 (e.g., one or more processors), a storage component 406 (e.g., a storage hierarchy), an input/output (I/O) network 408 (e.g., one or more I/O interfaces and/or devices), and a communications pathway 410. In general, the processing component 404 executes program code, such as the monitoring and control system 414, which is at least partially fixed in the storage component 406. While executing program code, the processing component 404 can process data, which can result in reading and/or writing transformed data from/to the storage component 406 and/or the I/O network 408 for further processing. The pathway 410 provides a communications link between each of the components in the computer system 402. The I/O network 408 can comprise one or more I/O devices, including sensors 13, 15, 16, 17, and camera 22 which enable a remote user 412 to interact with the computer system 402 and/or one or more communications devices to enable the system user 412 to wirelessly communicate with the computer system 402 using any type of communications link. To this extent, the monitoring and control system 414 can manage a set of interfaces (e.g., graphical user interface(s), application program interface, etc.) that enable human and/or system users 412 to interact with the monitoring and control system 414. Further, the monitoring and control system 414 can manage (e.g., store, retrieve, create, manipulate, organize, present, etc.) data, such as reactor temperature 60, the bath temperature 61, the RPM of the agitator motor 62, the pH of the reactor contents 63, the conductivity of the reactor contents 64, the pressure in the reactor 65 (e.g., data about the system 10, obtained by sensors 13, 14, 16, 17 and 21 (FIG. 1)), material addition data 67 from flow meter 35 and material removal data 68 from flow meter 55. The monitoring and control system 414 can perform actions, such as increasing or decreasing the reactor temperature 60, increasing or decreasing the bath temperature, increasing or decreasing the RPM of the agitator motor, increasing or decreasing the pH of the reactor contents through material addition, increasing or decreasing the conductivity of the reactor contents and increasing or decreasing the pressure in the reactor 65 (through system 40 (FIG. 4)) adding material to the reactor or removing material from the reactor. The camera 22 inputs the image/audio data 66 to monitoring and control system 414. The monitoring and control system 414 can additionally communicate with the reactor system 10 via wireless and/or hardwired means.

The wireless I/O network 408 may include communication-failure notification and diagnostics and has a large coverage range of around 1 Km radius. The low frequency 902-928 MHz radio waves can provide penetration through walls and other obstacles making it optimal for non-line-of-sight applications.

The storage component 406 stores data and the system 402 and monitoring and control system 414 can generate trends, graphics etc. All measured parameters can be trended in real time and time-stamped data logs can be accessed in an Excel file format. Alarm E-mail notifications can be generated and sent to selected recipients. These alarms can be configured for any measured parameter as requested e.g. high temperature, high pressure, low RPM, low pH, conductivity out of range, etc.

The computer system 402 is password protected. Operators can have full access to the active chemical process via the display and interface 32 or remote device. They can wirelessly monitor measured parameters, make changes to settings, view trends, set-up alarm trigger values, start and stop agitation and bath temperature profiles as well as view live video of the reactor from a picture-in-picture window.

The computer system 402 can comprise one or more general purpose computing articles of manufacture (e.g., computing devices) capable of executing program code, such as the monitoring and control system 414, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the monitoring and control system 414 can be embodied as any combination of system software and/or application software. It is further understood that the monitoring and control system 414 can be implemented in a cloud-based computing environment, where one or more processes are performed at distinct computing devices (e.g., a plurality of computing devices), where one or more of those distinct computing devices may contain only some of the components shown and described with respect to the computing device 424 of FIG. 5.

Further, the monitoring and control system 414 can be implemented using a set of modules 432. In this case, a module 432 can enable the computer system 402 to perform a set of tasks used by the monitoring and control system 414, and can be separately developed and/or implemented apart from other portions of the monitoring and control system 414. As used herein, the term "component" means any configuration of hardware, with or without software, which implements the functionality described in conjunction therewith using any solution, while the term "module" means program code that enables the computer system 402 to implement the functionality described in conjunction therewith using any solution. When fixed in a storage component 406 of a computer system 402 that includes a processing component 404, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 402.

When the computer system 402 comprises multiple computing devices, each computing device may have only a portion of monitoring and control system 414 fixed thereon (e.g., one or more modules 432). However, it is understood that the computer system 402 and monitoring and control system 414 are only representative of various possible equivalent computer systems that may perform a process described herein. To this extent, in other embodiments, the functionality provided by the computer system 402 and monitoring and control system 414 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 402 includes multiple computing devices 424, the computing devices can communicate over any type of communications link. Further, while performing a process described herein, the computer system 402 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 402 can obtain or provide data, such as, reactor temperature 60, bath temperature 61, RPM of the agitator motor 62, pH of the reactor contents 63, conductivity of the reactor contents 64, pressure in the reactor 65, the material added through data 67, the material removed through data 68 and image and audio data 66.

In embodiments, an operator may conduct an experiment with system 10 as follows. The operator may log into system which is password protected. Bath 20, which can be located on the mobile skid 30 in a fume hood (not shown), is turned on by its local power button (not shown). Once bath 20 is turned on and the reactor 11, and the operator is free to leave the laboratory and do all other monitoring and controls remotely and wirelessly.

Figure 6:
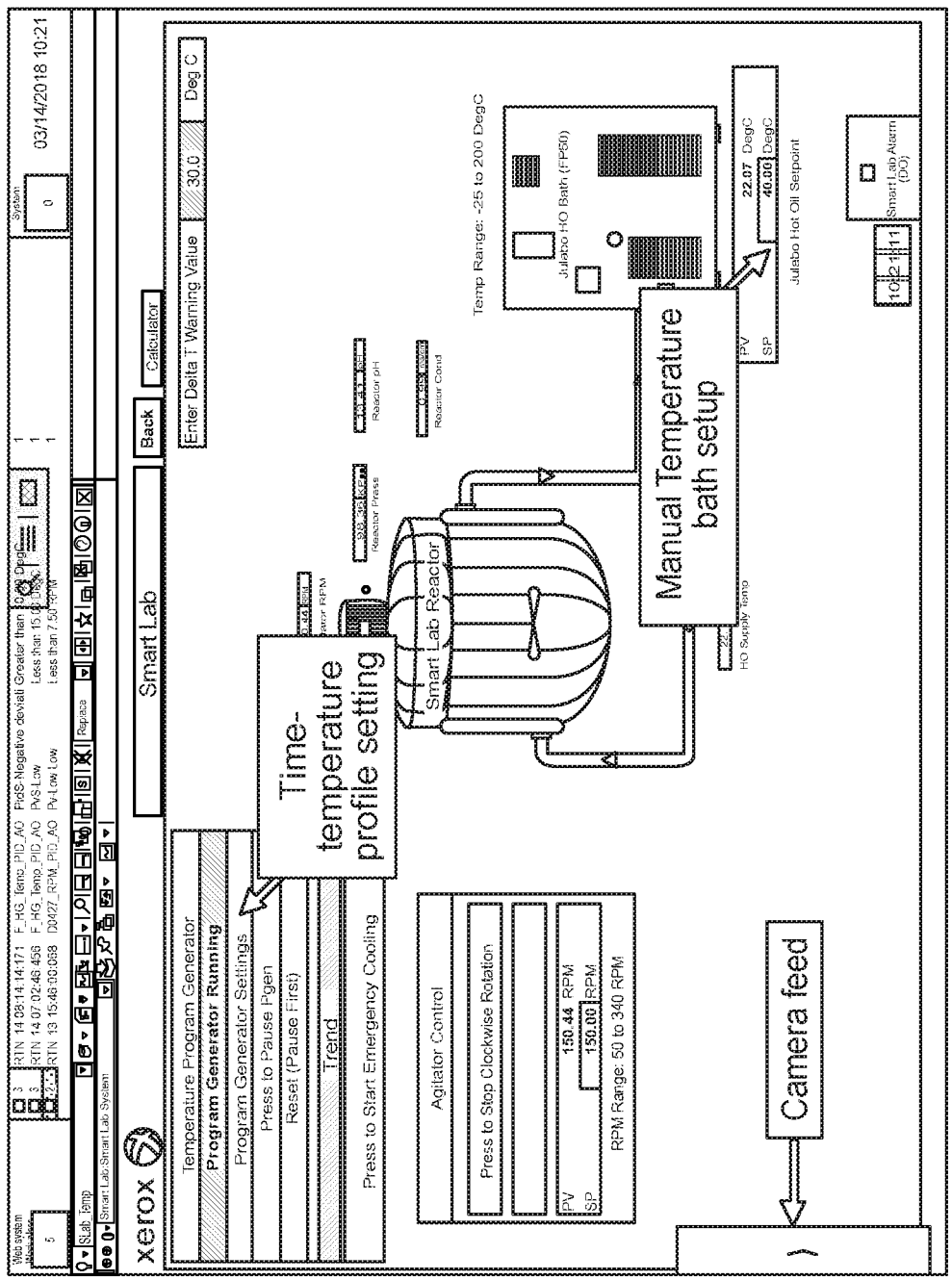
FIG. 6 shows a graphical user interface in accordance with the present disclosure.

An interface allows the operator to view and make the following changes remotely: time versus temperature for the reactor 11; bath temperature set-point; agitator start time, stop time, speed (RPM) set-point and rotational direction (i.e. clockwise or counter clockwise). The computer system 402 stores data and can provide data trends versus time for the temperatures, pH, conductivity, and RPM of the agitator motor 12. The trend data can be displayed on the operator's remote device or display interface 32. The interface allows the operator to remotely configure alarm set-points (e.g. temperature high and low alarms etc.) and emergency cooling start/stop (i.e. this sets the bath temperature set-point to 0° C.). An example representation of a graphical interface is shown in FIG. 6.

Figure 7:
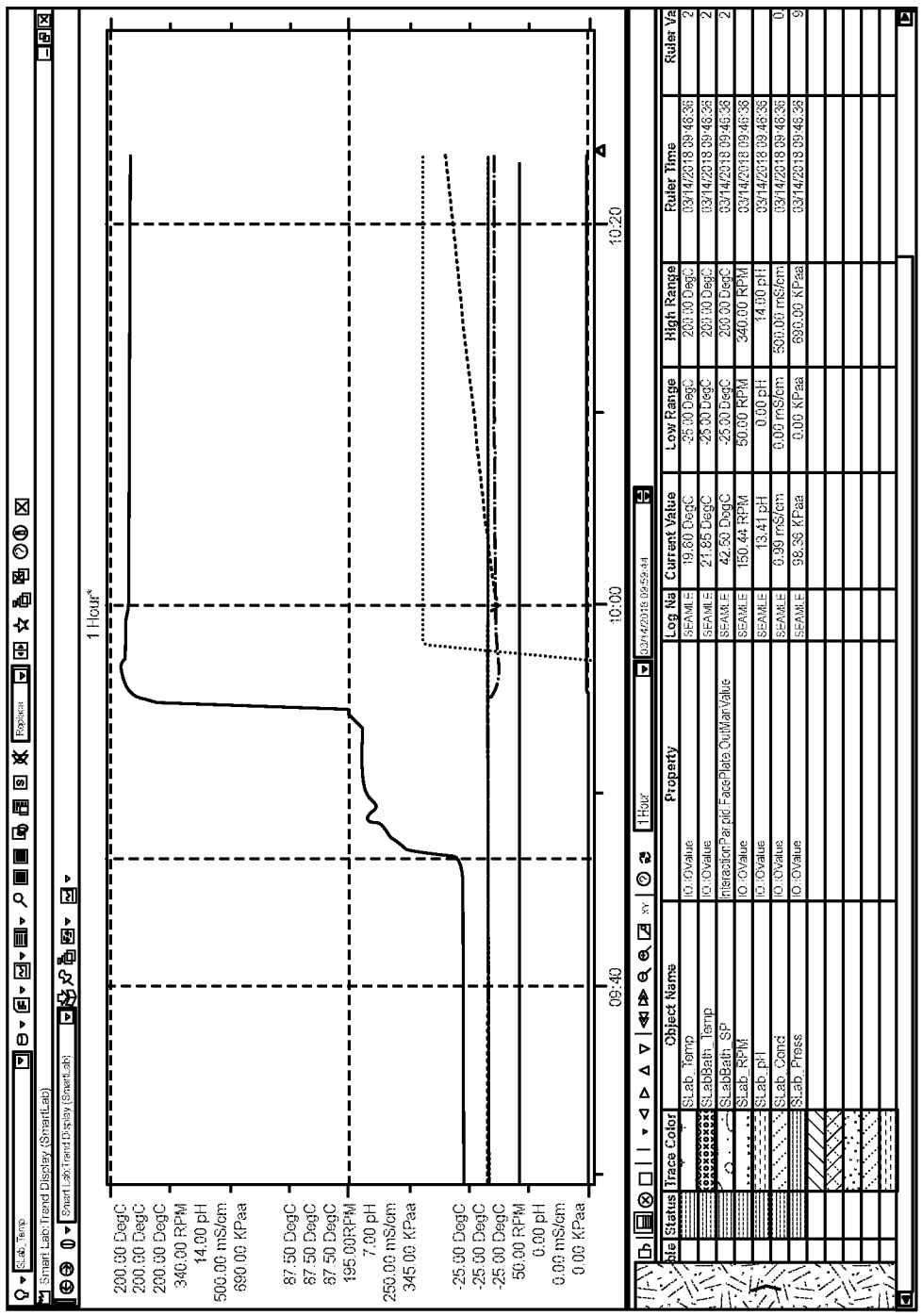
FIG. 7 shows a graphical depiction of trend lines of a reaction in accordance with the present disclosure.

A video and audio feed of reactor 11 can be displayed on the operator's remote device provided by camera 22 (FIG. 1). The display window for the video feed can be resized and docked if beneficial. The operator can view the trends, as shown in FIG. 7, at any time on the operator's remote device by simply clicking on trend button on the graphical interface. The trends shown in FIG. 7 can include all or some of the following measurements: (reactor temperature 60); (bath temperature 61); (bath temperature set-point); (reactor agitator speed 62 (RPM)); (reactor pH 63); (reactor conductivity 64); (reactor pressure 65), (material addition 67); and (material removal 68). In addition, real time video can be displayed and audio can be provided from the video/audio data 66 (FIG. 5). All this data is stored on the computer system 402 and backed up for future analysis and project management. To conclude the experiment, the operator conducts the following; the reactor temperature is configured to be brought to room temperature by either using the temperature profile generator or by manual set-point on the remote device. The operator 412 (FIG. 5) can remotely turn off the agitator motor 12 (FIG. 1). The contents of the reactor are discharged in embodiments through removal system 41 and power is turned off manually.

While shown and described herein as a system for monitoring and controlling a reactor, it is understood that aspects of the invention further provide various alternative embodiments. For example, in one embodiment, the invention provides a computer program fixed in at least one computer-readable medium, which when executed, enables a computer system to monitor and control a reactor. To this extent, the computer-readable medium includes program code, such as the monitoring and control system 414 (FIG. 5), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

Specific embodiments will now be described in detail. These examples are intended to be illustrative, and not limited to the materials, conditions, or process parameters set forth in these embodiments. All parts are percentages by solid weight unless otherwise indicated.

EXAMPLES

The synthesis of wintergreen oil demonstrated the versatility of the wireless portable laboratory reactor system 10. Synthesizing wintergreen oil involves the esterification of salicylic acid with methanol in the presence of sulfuric acid as a catalyst at 60° C. for 6 hours to produce methyl salicylate also known as "wintergreen oil."

The reaction scheme of wintergreen oil is shown below:

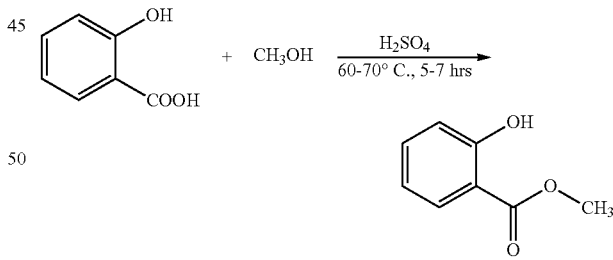

Four liters of methanol (3160 g, 98.62 mol) was manually added to a 6 liter glass reactor and the agitator motor 12 was set at 150 rpm. Then, 1275 g (9.23 mol) salicylic acid was added in the reactor followed by the addition of sulfuric acid 293.58 mL (540.18 g, 5.51 mol). A clear solution formed and the temperature of the reactor was remotely instructed through a remote computer to be elevated to 60° C. at a rate of 1° C./min utilizing the temperature bath 20. Once a measured temperature of 60° C. in the reactor was obtained, the solution was allowed to react at this temperature for 6 hours. The reactor 11 was instructed remotely to be cooled from 60° C. to 40° C. at −1° C./min using the bath 20. The reactor 11 was then discharged manually and the liquid crude mixture was divided into two equal fractions to facilitate product isolation.

One fraction was manually loaded to reactor 11 together along with 1 liter of deionized water (DIW) and 500 mL of dichloromethane. The contents were remotely instructed to be mixed for 10 minutes at 100 RPM, after which the mixing was stopped through remote instructions and the dichloromethane layer containing the product was allowed to separate. The bottom layer was manually drained and set aside while the top layer, containing acidic water and methanol, was discharged and discarded. The dichloromethane layer was manually charged in the reactor and manually washed twice with two liters of 10% by weight sodium bicarbonate solution, followed by a manual wash with one liter of 10% by weight sodium bicarbonate solution while mixing at 150 rpm for 10 minutes. The dichloromethane layer was manually recharged in the reactor and finally washed with two liters of DIW. The dichloromethane layer was separated and set aside and the pH of the DIW layer was checked and confirmed to be 7 after which the DIW layer was discarded.

The same succession of operations were repeated for the second fraction.

The two isolated fractions of dichloromethane containing product were combined and manually loaded into the reactor. 50 g of magnesium sulfate were manually added to the combined solution. The solution was allowed to sit over magnesium sulfate for 30 minutes after which the magnesium sulfate was removed by manual filtration.

Finally, the dichloromethane was removed in a vacuum to afford 679 g (48%) of wintergreen oil with a very strong characteristic smell.

Figure 8:
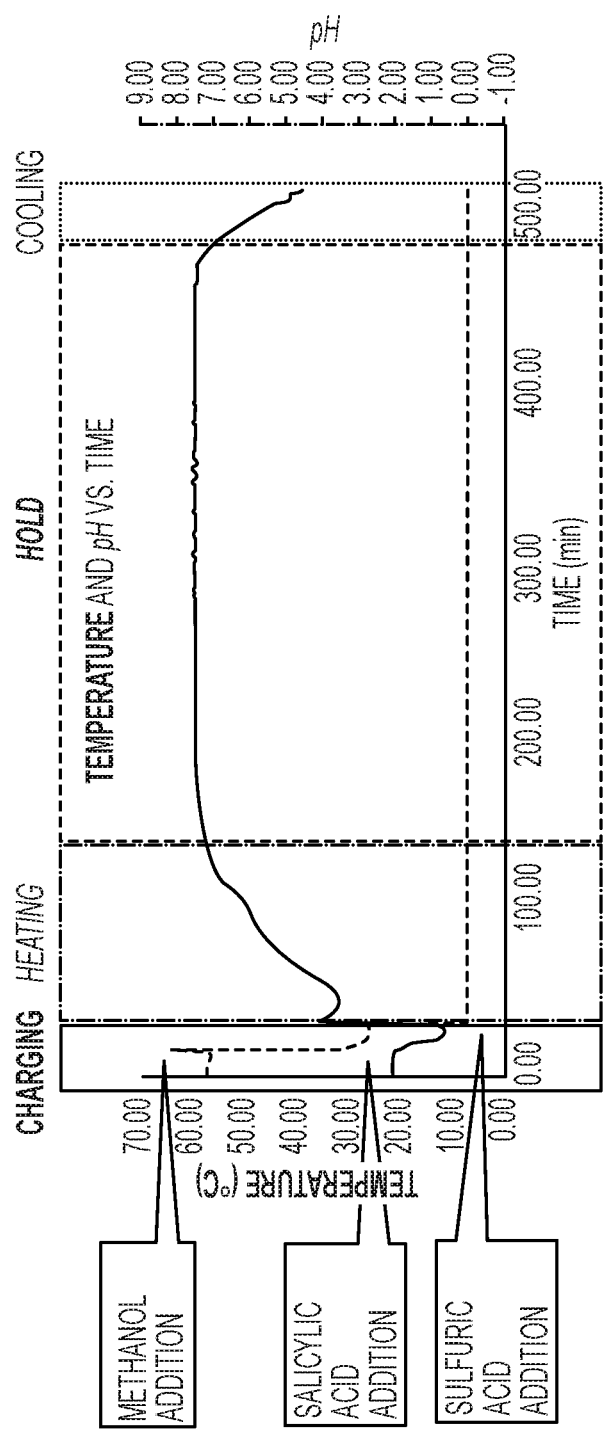
FIG. 8 shows pH trend of a reaction in accordance with the present disclosure.

The pH was recorded in real time and the pH trend from the moment the reactor was charged is shown FIG. 8. FIG. 8 shows that during charging (i.e. blue boxed area) the pH changed from 7 to about 8 when methanol was added into the reactor, then decreased to about 3 during the salicylic acid addition and finally to 0 when the sulfuric acid catalyst was added. The pH remained at 0 for the rest of the process.

Figure 9:
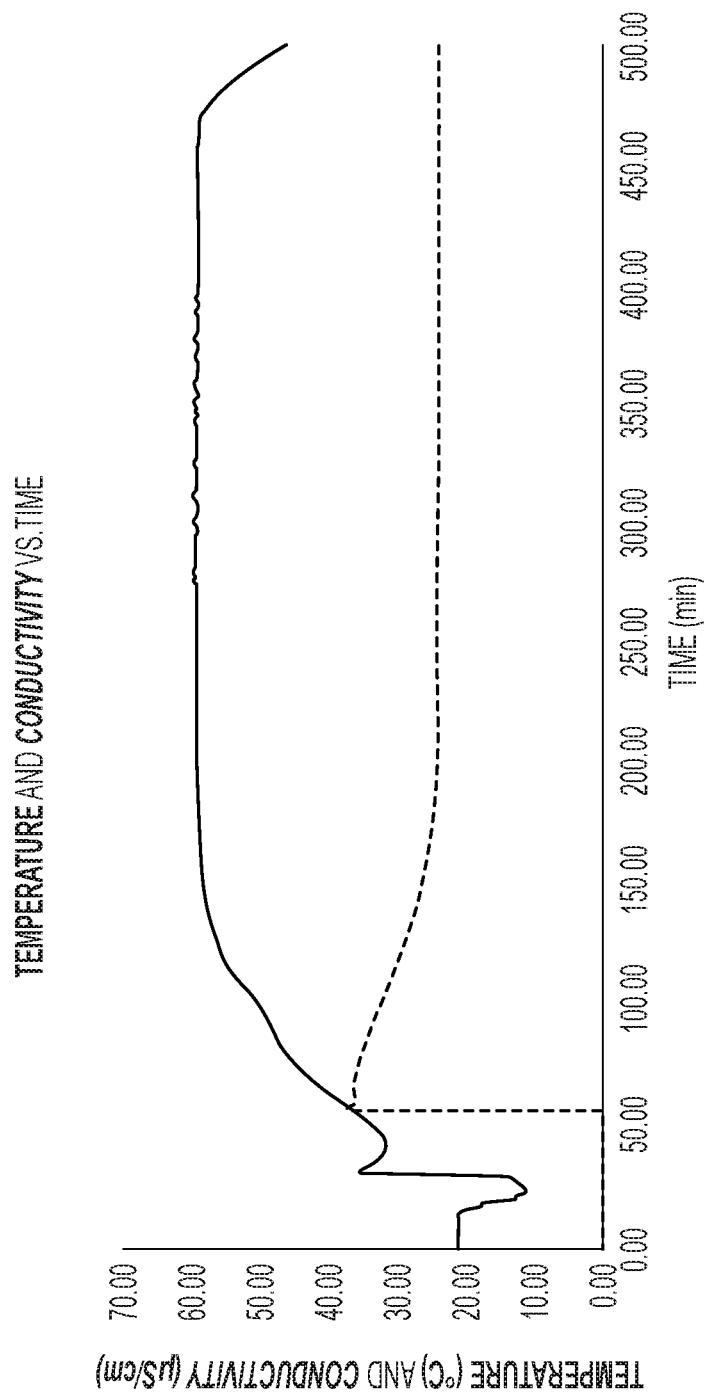
FIG. 9 shows conductivity trend of a reaction in accordance with the present disclosure.

FIG. 9 is a graph indicating the trend in conductivity during the esterification process. The conductivity trend was observed mainly during the heating and the hold time at 60° C. During this time, a decrease in conductivity occurred from about 37 mS/cm at 60 minutes to about 24 mS/cm at 215 minutes.

Benefits disclosed according to various embodiments herein can include, relative to conventional approches: increased productivity, increased lab utilization, lower labor and system cost, improved chemical process quality, process optimization and customization, reduced ergonomic issues and increased flexibility due to the wireless remote monitoring, controlling and surveilling, modularity and portability.

The system and computer program product disclosed herein enables the chemical laboratory reactor to operate at any time. The remote operation can be conducted in a safe and secure environment, with the operator always having the convenience of being at a remote location.

The system and computer program product disclosed according to various embodiments herein can be configured, designed and built based on laboratory process needs e.g. different types and sizes of reactors (i.e. glass, metal, pressure or non-pressure rated etc.), different measured and controlled parameters (i.e. temperature, pressure, pH etc.), and/or different bath specifications (i.e. power, heating/cooling media type etc.)

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

What is claimed is:

1. An automated wireless laboratory system comprising:
   a reactor having multiple ports;
   a drive motor for agitating contents within the reactor;
   a speed sensor for measuring revolutions per minute of the drive motor;
   a temperature sensor for measuring a temperature within the reactor;
   a pressure sensor for measuring a pressure within the reactor;
   a pH sensor for measuring a pH of contents within the reactor;
   a conductivity sensor for measuring a conductivity of the contents within the reactor;
   a bath surrounding the reactor for at least one of heating or cooling the reactor;
   a bath temperature sensor for measuring a temperature within the bath; and
   at least one computing device configured to:
     monitor and wirelessly transmit data about: the temperature within the reactor; the pressure within the reactor, the pH, the conductivity, the revolutions per minute, and the temperature within the bath;
     receive wireless instructions from a remote user that specify the speed of the drive motor, the temperature with in the reactor, the bath temperature, the pH, the pressure; and
     set the speed of the drive motor, set the temperature with in the reactor, set the pH, and set the pressure based upon wireless instructions from the remote user.

2. The automated system of claim 1, further comprising:
   a portable skid wherein the reactor is mounted on the portable skid.

3. The automated system of claim 1, further comprising:
   a camera for providing continuous images of the reactor, the camera connected to the at least one computing device, the at least one computing device wirelessly transmitting images of the reactor to the remote user.

4. The automated system of claim 3, further comprising a multi-axis adjustable arm for mounting the camera and allowing remote adjustment of a camera position.

5. The automated system of claim 1, further comprising:
   a material addition system for adding material to the reactor through one of the multiple ports, the material addition system including a material container, a valve, a pump and a flow meter, each connected to the at least one computing device.

6. The automated system of claim 1, further comprising:
   a material removal system for removing material from the reactor through one of the multiple ports, the material removal system including a material container, a valve, a pump and a flow meter, each connected to the at least one computing device.

7. The automated system of claim 1, further comprising:
   a pressure control system for controlling pressure in the reactor through one of the multiple ports, the pressure control system including a gas supply, a pressure regulator valve, and a vent valve, each connected to the at least one computing device.

8. A system comprising:
at least one computing device configured to control a reactor system, the reactor system including,
a reactor having a plurality of ports;
a drive motor for agitating contents within the reactor;
a speed sensor for measuring revolutions per minute of the drive motor;
a temperature sensor for measuring a temperature within the reactor;
a pressure sensor for measuring a pressure within the reactor;
a pH sensor for measuring a pH of the contents within the reactor;
a conductivity sensor for measuring a conductivity of the contents within the reactor;
a bath surrounding the reactor for at least one of heating or cooling the reactor;
a bath temperature sensor for measuring a temperature of the bath;
the computing device configured to:
transmit wirelessly to a remote user; the temperature within the reactor, the temperature of the bath, the pressure, the pH, the conductivity, and or the revolutions per minute;
receive wireless instructions from the remote user that specify; the RPM of the drive motor; the temperature in the reactor, the temperature of the bath, the pH, and the pressure; and
set the speed of the drive motor, the temperature in the reactor, the temperature of the bath, the pH, and the pressure based upon wireless instructions from the remote user.

9. The system of claim 8, further comprising:
a portable skid wherein the reactor system is mounted on the portable skid.

10. The system of claim 8, further comprising:
a camera for providing continuous images of the reactor, the camera connected to the at least one computing device, the at least one computing device wirelessly transmitting images of the reactor to the remote user.

11. The system of claim 10, further comprising a multi-axis adjustable arm for mounting the camera and allowing remote adjustment of a camera position.

12. The system of claim 8, further comprising:
a material addition system for adding material to the reactor through one of the plurality of ports, the material addition system including a material container, a valve, a pump and a flow meter each connected to the at least one computing device.

13. The automated system of claim 8, further comprising:
a material removal system for removing material from the reactor through one of the plurality of ports, the material removal system including a material container, a valve, a pump and a flow meter each are connected to the at least one computing device.

14. The automated system of claim 8, further comprising:
a pressure control system for controlling pressure in the reactor through one of the plurality of ports, the pressure system including a gas supply, a pressure regulator valve, and a vent valve, each connected to the at least one computing device.

15. A computer program product comprising program code stored in a non-transitory computer readable medium, which when executed by at least one computing device, causes the at least one computing device to control a reactor having multiple ports by performing actions including:
wirelessly transmit to a remote user; a temperature within the reactor, a temperature in a bath surrounding the reactor, a pressure in the reactor, a pH in the reactor, a conductivity in the reactor, and revolutions per minute of an agitator in the reactor;
receiving wireless instructions from the remote user that specify; a RPM of the drive motor and adjusting the agitator motor to the RPM; a temperature in the bath with in the reactor and adjusting the bath temperature, the pH, the pressure and the conductivity; and
set the speed of the drive motor, the temperature in the reactor, the bath temperature, the pH, and the pressure based upon wireless instructions from the remote user.

16. The computer program product of claim 15, further comprising:
a portable skid wherein the reactor is mounted on the portable skid.

17. The computer program product of claim 15, further comprising:
wirelessly transmitting to a remote user continuous images of the reactor through a camera, the camera connected to the at least one computing device.

18. The computer program product of claim 15, further comprising:
transmitting wireless instructions from the remote user to a material addition system for adding material to the reactor through one of the multiple ports, the material addition system including a material container, a valve, a pump and a flow meter each connected to the at least one computing device.

19. The computer program product of claim 15, further comprising:
transmitting wireless instructions from the remote user a material removal system for removing material from the reactor through one of the multiple ports, the material removal system including a material container, a valve, a pump and a flow meter each connected to the at least one computing device.

20. The computer program product of claim 15, further comprising:
transmitting wireless instructions from the remote user to a pressure control system for controlling pressure in the reactor through one of the multiple ports, the pressure system including a gas supply, a pressure regulator valve, and a vent valve, each connected to the at least one computing device.

* * * * *